United States Patent
Yamaguchi et al.

(10) Patent No.: US 9,515,528 B2
(45) Date of Patent: Dec. 6, 2016

(54) PERMANENT MAGNET ROTARY ELECTRIC MACHINE

(71) Applicant: Mitsubishi Electric Corporation, Tokyo (JP)

(72) Inventors: Shinichi Yamaguchi, Tokyo (JP); Yoshiki Maeda, Tokyo (JP); Kazuaki Ando, Tokyo (JP); Koki Naka, Tokyo (JP); Masaya Harakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/033,239

(22) PCT Filed: Jan. 6, 2014

(86) PCT No.: PCT/JP2014/050017
§ 371 (c)(1),
(2) Date: Apr. 29, 2016

(87) PCT Pub. No.: WO2015/102047
PCT Pub. Date: Jul. 9, 2015

(65) Prior Publication Data
US 2016/0254713 A1    Sep. 1, 2016

(51) Int. Cl.
*H02K 21/12*    (2006.01)
*H02K 1/27*    (2006.01)

(52) U.S. Cl.
CPC .................................. *H02K 1/278* (2013.01)

(58) Field of Classification Search
CPC ....... H02K 1/278; H02K 1/28; H02K 2213/03
USPC ...................... 310/156.12–156.13, 156.38–156.39, 310/156.28, 156.44–156.46
See application file for complete search history.

(56) References Cited

U.S. PATENT DOCUMENTS

| 6,093,984 A | 7/2000 | Shiga et al. |
| 6,707,209 B2 | 3/2004 | Crapo et al. |
| 7,425,785 B2* | 9/2008 | Domeki ................. H02K 1/278 310/156.38 |
| 8,039,998 B2 | 10/2011 | Masuzawa et al. |

(Continued)

FOREIGN PATENT DOCUMENTS

| JP | 08-205437 A | 8/1996 |
| JP | 10-136596 A | 5/1998 |

(Continued)

OTHER PUBLICATIONS

International Search Report for PCT/JP2014/050017 dated Apr. 8, 2014 [PCT/ISA/210].

(Continued)

*Primary Examiner* — Thanh Lam
(74) *Attorney, Agent, or Firm* — Sughrue Mion, PLLC; Richard C. Turner

(57) ABSTRACT

A permanent magnet rotary electric machine includes: a stator in which a plurality of teeth and a plurality of slots are formed on an inner periphery of a cylindrical stator core, and a winding wire is wound around the teeth so as to be disposed in the slots; and a rotor disposed in a hollow portion of the stator with an air gap between the rotor and the stator. In the rotor, 2n or more (n is a natural number equal to or larger than 1) radial projections are provided on an outer periphery of a rotor core, and a ferrite magnet is disposed between adjacent projections. A radial height of the projection is less than a thickness of middle of the ferrite magnet.

8 Claims, 8 Drawing Sheets

(56) References Cited

U.S. PATENT DOCUMENTS

| | | | |
|---|---|---|---|
| 8,648,513 B2 * | 2/2014 | Nakano | B62D 5/0403 310/156.01 |
| 8,981,612 B2 | 3/2015 | Yokoyama et al. | |
| 2002/0067092 A1 * | 6/2002 | Crapo | H02K 1/278 310/156.47 |
| 2008/0218007 A1 | 9/2008 | Masuzawa et al. | |
| 2009/0102304 A1 | 4/2009 | Yamamura et al. | |
| 2009/0195104 A1 * | 8/2009 | Akutsu | H02K 1/278 310/156.38 |
| 2009/0251023 A1 | 10/2009 | Nakano et al. | |
| 2010/0244605 A1 | 9/2010 | Nakano et al. | |
| 2011/0140562 A1 * | 6/2011 | Kato | H02K 1/2746 310/156.57 |
| 2012/0139372 A1 * | 6/2012 | Nakano | H02K 1/148 310/83 |
| 2012/0187792 A1 * | 7/2012 | Maruyama | H02K 1/278 310/156.28 |
| 2013/0113329 A1 | 5/2013 | Yokoyama et al. | |
| 2015/0076950 A1 | 3/2015 | Asao et al. | |

FOREIGN PATENT DOCUMENTS

| | | |
|---|---|---|
| JP | 2001-037122 A | 2/2001 |
| JP | 2001-275285 A | 10/2001 |
| JP | 2004-208341 A | 7/2004 |
| JP | 2005-065417 A | 3/2005 |
| JP | 2005-237161 A | 9/2005 |
| JP | 2008245406 A | 10/2008 |
| JP | 2009106065 A | 5/2009 |
| JP | 2009254103 A | 10/2009 |
| JP | 2011-120334 A | 6/2011 |
| JP | 2012-005251 A | 1/2012 |
| JP | 2012-235690 A | 11/2012 |
| JP | 2013-106417 A | 5/2013 |
| TW | 434974 B | 5/2001 |
| TW | M313905 U | 6/2007 |
| WO | 2006/064948 A1 | 6/2006 |
| WO | 2011/064834 A1 | 6/2011 |
| WO | 2013/179510 A1 | 12/2013 |

OTHER PUBLICATIONS

Written Opinion for PCT/JP2014/050017 dated Apr. 8, 2014 [PCT/ISA/237].

Japan Office Action of JP Patent Application No. 2014-526011 dated Jul. 8, 2014.

Taiwan Office Action of TW Patent Application No. 103110436 dated Jun. 5, 2015.

Korean Office Action corresponding to Korean Patent Application No. 10-2016-7017196, mailed on Sep. 23, 2016.

* cited by examiner

PERMANENT MAGNET ROTARY ELECTRIC MACHINE

CROSS REFERENCE TO RELATED APPLICATIONS

This application is a National Stage of International Application No. PCT/JP2014/050017 filed Jan. 6, 2014, the contents of all of which are incorporated herein by reference in their entirety.

FIELD

The present invention relates to a permanent magnet rotary electric machine in which a permanent magnet is disposed on an outer periphery of a rotor.

BACKGROUND

A conventional permanent magnet rotary electric machine is disclosed, for example, in Patent Literatures 1 and 2. The permanent magnet rotary electric machine includes a rotor placed in a hollow portion of a stator with an air gap between the rotor and the stator. A plurality of radial projections are provided on an outer periphery of a rotor core, and a thin permanent magnet is disposed between adjacent projections. A radial height of the projection is set to be less than a thickness of middle of the permanent magnet.

CITATION LIST

Patent Literatures

Patent Literature 1: Japanese Patent Application Laid-Open No. 2001-037122 (paragraphs 0020 to 0022, FIG. 5)
Patent Literature 2: Japanese Patent Application Laid-Open No. 2005-065417 (paragraphs 0025, 0034, and 0035, and FIG. 1)

SUMMARY

Technical Problem

According to the conventional techniques described in Patent Literatures 1 and 2 listed above, it is possible to reduce torque pulsations to some extent. However, because thin permanent magnets are used, a reluctance torque is low, which causes decrease in an average torque.

The present invention has been achieved to solve the above problem, and an object of the present invention is to provide a permanent magnet rotary electric machine that achieves high torque while reducing torque pulsations.

Solution to Problem

To solve the above-mentioned problem and achieve the object, the present invention provides a permanent magnet rotary electric machine including: a stator in which a plurality of teeth and a plurality of slots are formed on an inner periphery of a cylindrical stator core, and a winding wire is wound around the teeth so as to be disposed in the slots; and a rotor disposed in a hollow portion of the stator with an air gap between the rotor and the stator. In the rotor, a radial projection is provided on an outer periphery of a rotor core, the number of the projection is 2n or more (n is a natural number equal to or larger than 1), and a ferrite magnet is disposed between adjacent projections. A radial height of the projection is less than a thickness of middle of the ferrite magnet.

Advantageous Effects of Invention

In the permanent magnet rotary electric machine according to the present invention, the ferrite magnet having a sufficient radial thickness relative to a length of the air gap is employed. Moreover, the projection is provided and thereby a saliency ratio can be obtained. As a result, it is possible to reduce torque pulsations while suppressing decrease in the torque.

DESCRIPTION OF EMBODIMENTS

Exemplary embodiments of a permanent magnet rotary electric machine according to the present invention will be explained below in detail with reference to the accompanying drawings. The present invention is not limited to the embodiments.

First Embodiment

Figure 1:
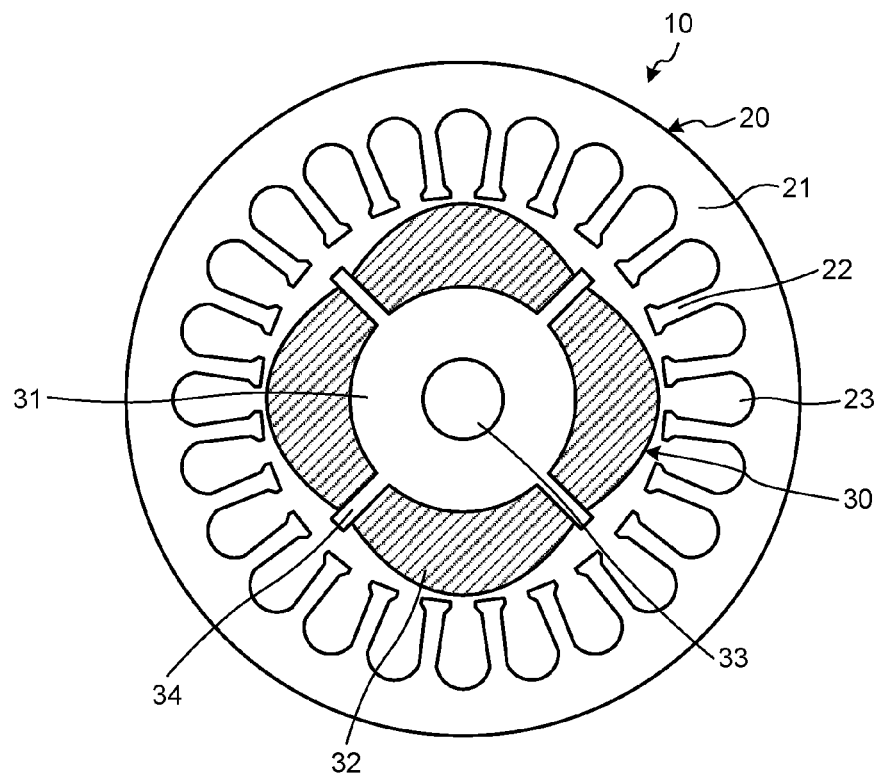
FIG. 1 is a cross-sectional view illustrating a permanent magnet rotary electric machine according to a first embodiment of the present invention.
Figure 2:
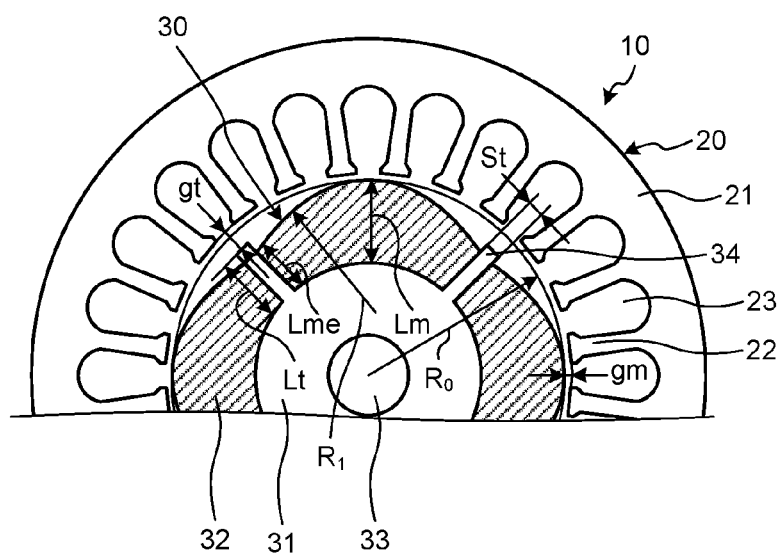
FIG. 2 is a partially-enlarged view of FIG. 1.

FIG. 1 is a cross-sectional view illustrating a permanent magnet rotary electric machine according to a first embodiment of the present invention. FIG. 2 is a partially-enlarged view of FIG. 1. As illustrated in FIGS. 1 and 2, the permanent magnet rotary electric machine 10 according to the first embodiment includes a stator 20 and a rotor 30. In the stator 20, teeth 22 and slots 23 are formed on an inner periphery of a cylindrical stator core 21, where the number of the teeth 22 and the number of the slots 23 each is 24 (when n is a natural number equal to or larger than 1, the number of teeth is generally 3n, although the present invention is not limited thereto). Moreover, a winding wire is wound around the teeth 22 so as to be disposed in the slots 23. The rotor 30 is supported by a shaft 33 and disposed in a hollow portion of the stator 20 with an air gap between the rotor and the stator. Moreover, four (2n; n is a natural number equal to or larger than 1) ferrite magnets 32 are disposed on an outer periphery of a rotor core 31.

The permanent magnet rotary electric machine 10 according to the first embodiment is a rotary electric machine where the number of poles is four, the number of slots is 24, the number of phases is three, and the number of slots per pole per phase is two. Illustrations of the winding wires disposed in the slots 23 are omitted in FIGS. 1 and 2. Each of the stator core 21 and the rotor core 31 of the permanent magnet rotary electric machine 10 in the first embodiment is formed by stacking a plurality of magnetic steel sheets.

On the outer periphery of the rotor core 31, four radial projections 34 are provided at regular intervals in a circumferential direction, and the ferrite magnet 32 is disposed between the adjacent projections 34. In the permanent magnet rotary electric machine 10 according to the first embodiment, a projection width St of the projection 34 in the circumferential direction (see FIG. 2) is in a range from 5% to 11% of a magnetic pole pitch which is defined by "π×rotor outer diameter/number of poles".

A radial height Lt of the projection 34 (see FIG. 2) is less than a thickness Lm of magnet middle of the ferrite magnet 32 and greater than a thickness Lme of magnet edge of the ferrite magnet 32. A curvature radius $R_1$ of an outer periphery of the magnet is in a range from 60% to 100% of a rotor radius $R_0$. The thickness Lm of the magnet middle of the ferrite magnet 32 is 10 or more times larger than an air gap length gm that is a radial length of the air gap between the rotor 30 and the stator 20.

Effects of the permanent magnet rotary electric machine 10 according to the first embodiment will be described below.

<Magnet Coercive Force and Required Magnet Thickness>

Figure 3:
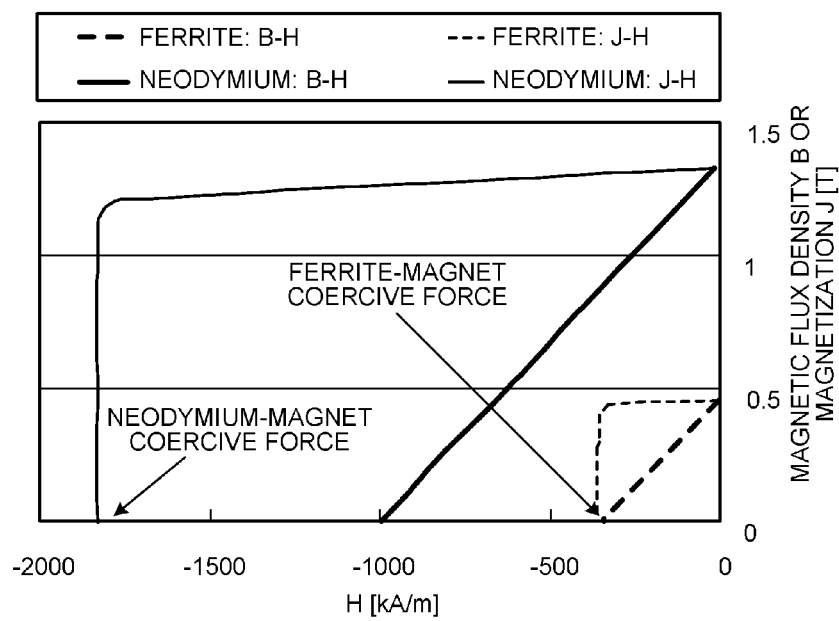
FIG. 3 is a diagram showing magnetic properties of a ferrite magnet and a neodymium magnet as typical examples.

First, let us explain a magnet material used in the permanent magnet rotary electric machine 10 in the first embodiment. FIG. 3 is a diagram showing J-H curves and B-H curves which are magnetic property curves of a ferrite magnet and a neodymium magnet as typical examples.

The J-H curve represents how intensity of magnetization of a permanent magnet varies depending on an external magnetic field. The B-H curve represents a total magnetic flux density obtained by adding the magnetization of the permanent magnet to the intensity of the external magnetic field. An intersection of the J-H curve and the x-axis (a horizontal axis passing through the origin) in FIG. 3 is referred to as coercive force $iH_c$ of the permanent magnet. The coercive force $iH_c$ represents resistance of the permanent magnet against the external magnetic field.

When a magnetic field with intensity lower than the coercive force $iH_c$ is applied to the permanent magnet and then the application of the magnetic field is eliminated, a magnetic force of the permanent magnet returns back to a state before the application of the magnetic field. However, when a magnetic field with intensity equal to or higher than the coercive force $iH_c$ is applied to the permanent magnet, the magnetic force becomes lower than that before the application of the magnetic field, even after the application of the magnetic field is eliminated. This phenomenon is referred to as demagnetization of the permanent magnet.

Meanwhile, a magnetic field acting on the permanent magnet can be obtained by a sum of an external magnetic field $H_c$ generated by a current flowing through the winding wire of the stator 20 and a demagnetization field $H_{in}$ determined by a shape of the permanent magnet, a gap length, and the like. The demagnetization field $H_{in}$ is determined particularly by the thickness Lm of the permanent magnet and the air gap length gm. Assuming that a surface area of the permanent magnet is equal to a surface area of the gap, the demagnetization field $H_{in}$ can be obtained by the following equation (1) by using a permeance coefficient $P_c$ (=thickness Lm of permanent magnet/air gap length gm). In the equation (1), $B_r$ represents a remanence of the permanent magnet (the value of B on the B-H curve, where H=0), $\mu_0$ represents a relative permeability of vacuum, and $\mu_r$ represents a recoil relative permeability of the permanent magnet.

[Equation 1]

$$Hin = -\frac{B_r}{\mu_0(\mu_r + Pc)} = -\frac{B_r}{\mu_0\left(\mu_r + \frac{L_m}{g_m}\right)} \qquad (1)$$

Since the permanent magnet rotary electric machine 10 generates a torque by supplying a current to the winding wire of the stator 20, it is necessary to design it such that the current can flow as much as possible. To this end, it is necessary to design a ratio ($H_{in}/iH_c$) of the internal demagnetization field $H_{in}$ of the ferrite magnet 32 to the coercive force $iH_c$ of the ferrite magnet 32 to be low.

Figure 4:
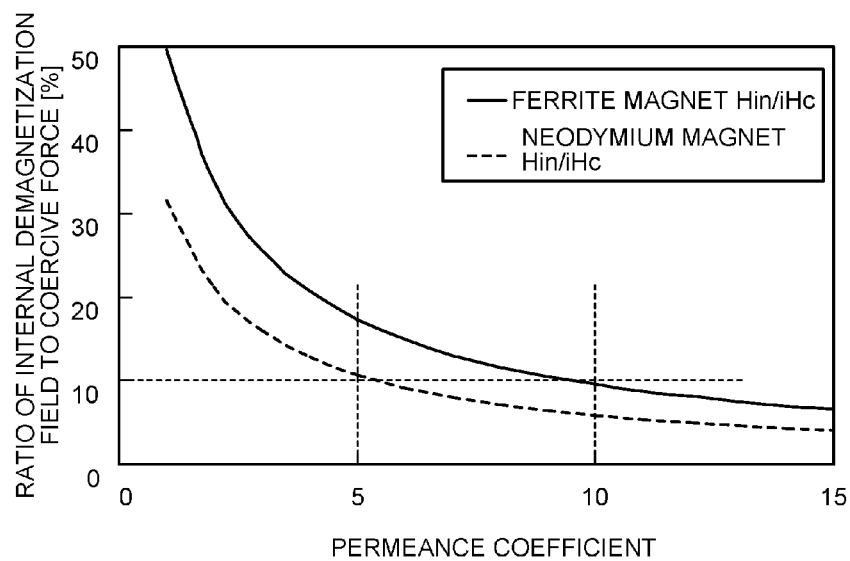
FIG. 4 is a diagram showing a relation between a permeance coefficient (=magnet thickness/air gap length) and a ratio of an internal demagnetization field to coercive force of a permanent magnet.

Next, let us consider a relation between the internal demagnetization field ratio ($H_{in}/iH_c$) and the permeance coefficient Pc (=magnet thickness Lm/air gap length gm). FIG. 4 is a diagram showing a relation between the permeance coefficient Pc and the ratio of the internal demagnetization field $H_{in}$ to the coercive force $iH_c$ of the permanent magnet, in which calculation results of the ratio of the internal demagnetization field $H_{in}$ to the coercive force $iH_c$ for the neodymium magnet and the ferrite magnet are shown.

As can be seen from FIG. 4, the neodymium magnet and the ferrite magnet are different in the ratio of the internal demagnetization field $H_{in}$ to the coercive force $iH_c$ at the same permeance coefficients Pc (magnet thickness Lm/air gap length gm). In designing the permanent magnet rotary electric machine 10, the ratio of the internal demagnetization field $H_{in}$ is typically designed to be approximately 10%. To this end, as shown in FIG. 4, the permeance coefficient Pc of approximately 5 is required in the case of the neodymium magnet, and the permeance coefficient Pc of approximately 10 is required in the case of the ferrite magnet.

Meanwhile, the air gap length gm contributing to the permeance coefficient Pc, which may vary depending on a manufacturing method and a size of the permanent magnet rotary electric machine 10, is usually about 0.5 to 2.0 mm in a case of a surface magnet rotary electric machine (an SPM rotary electric machine) such as the ferrite magnet rotary electric machine 10 and a neodymium magnet rotary electric machine. For example, let us consider a case where the air gap length gm is 1 mm. In this case, the magnet thickness Lm required for achieving the above-mentioned permeance coefficient Pc is approximately 5 mm in the case of the neodymium magnet rotary electric machine while approximately 10 mm in the case of the ferrite magnet rotary electric machine.

It should be noted that in either case of the neodymium magnet rotary electric machine or the ferrite magnet rotary electric machine 10, it is designed so as to minimize usage amount of the magnet as much as possible in order to reduce costs. Accordingly, based on the magnet thickness Lm described above, limit design is performed in consideration of specifications such as the maximum torque (the magnetic field at the time when the maximum current is supplied) of the permanent magnet rotary electric machine.

In the case of the rotary electric machine using the ferrite magnet 32 having the low coercive force, it is necessary to make the magnet thickness Lm larger than the the air gap length gm. The permanent magnet rotary electric machine 10 according to the first embodiment is based on this characteristic and has a structure suitable for the rotary electric machine using the ferrite magnet 32.

<Projection Width and Torque Pulsation>

Next, let us explain a torque pulsation reduction effect of the permanent magnet rotary electric machine 10 according to the first embodiment. The torque of the permanent magnet rotary electric machine 10 is roughly proportional to a product of an induced voltage generated by the ferrite magnets 32 and a current flowing through the winding wire of the stator 20. Therefore, when a waveform of each of the induced voltage and the flowing current is an optimum sinusoidal waveform, the generated torque has a constant value. However, when harmonic components are included in the induced voltage, it causes torque pulsations.

In particular, components with frequencies of 6i times higher than a power-supply frequency ("i" is an integer; 6f, 12f, or the like) are generated as the torque pulsations in the three-phase permanent magnet rotary electric machine 10. The torque pulsation of the 6f component is caused by the fifth-order and seventh-order harmonic components of the induced voltage. The torque pulsation of the 12f component is caused by the eleventh-order and thirteenth-order harmonic components of the induced voltage. Accordingly, in order to reduce the torque pulsations in the permanent magnet rotary electric machine 10, it is necessary to reduce the fifth-order, seventh-order, eleventh-order, and thirteenth-order harmonic components of the induced voltage as much as possible.

The induced voltage is generated by time variation in air-gap magnetic flux density. Therefore, in order to reduce the harmonic components of the induced voltage, it is necessary to reduce harmonic components of the air-gap magnetic flux density. Meanwhile, as to the average torque, it is necessary to increase a fundamental component of the induced voltage, that is, a fundamental component of the air-gap magnetic flux density as much as possible.

To this end, the harmonic components of the air-gap magnetic flux density in the case of the structure of the rotor 30 of the permanent magnet rotary electric machine 10 according to the first embodiment are first calculated. A magnet pitch $2\alpha$ is calculated by {magnet width/(rotor outer diameter×π/number of poles)}×π="magnet width×πnumber of poles/rotor outer diameter". An air-gap magnetic flux density $B_g(\theta)$ of the air-gap middle in a circumferential direction can be calculated by the following equation (2). Here, the magnet width is a width of the permanent magnet in a rotational direction. In the equation (2), γ represents a harmonic order, gm represents the air gap length, Lm represents the radial thickness of the magnet, $\mu_r$ represents the recoil relative permeability of the permanent magnet, and $B_r$ represents the remanence of the permanent magnet. Here, the radius $R_0$ of the rotor 30 is assumed to be equal to the curvature radius $R_1$ of the outer periphery of the ferrite magnet 32.

[Equation 2]

$$B_g(\theta) = \frac{B_r}{1 + \frac{g_m}{L_m}\mu_r} \sum_{\gamma=1}^{\infty} \frac{4}{n\pi} \sin(2\gamma a)\cos(\gamma\omega\theta) \qquad (2)$$

Figure 5:
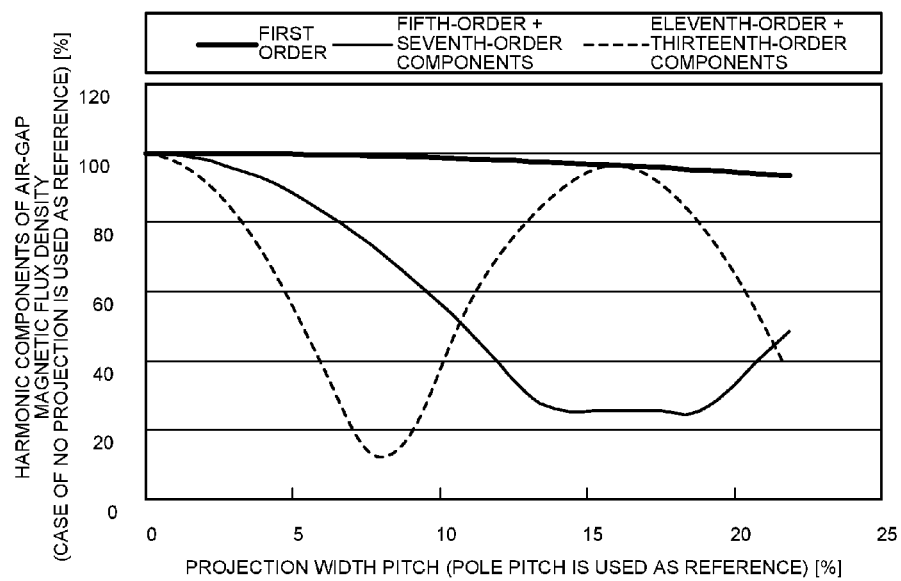
FIG. 5 is a diagram showing a relation between a projection width pitch and harmonic components of an air-gap magnetic flux density in the permanent magnet rotary electric machine according to the first embodiment.

FIG. 5 is a diagram showing a relation between a projection width and the harmonic components of the air-gap magnetic flux density in the permanent magnet rotary electric machine 10 according to the first embodiment, which is obtained by using the equation (2). In FIG. 5, the projection width is expressed as a projection width pitch where a magnetic pole pitch (=rotor outer diameter×π/number of poles) is used as a reference. Further, in order to examine the average torque and the torque pulsations, we focus on the fundamental component, a sum of the fifth-order and seventh-order harmonic components, and a sum of the eleventh-order and thirteenth-order harmonic components of the air-gap magnetic flux density, wherein a case of no projection (where the projection width is zero) is used as a reference.

As shown in FIG. 5, the fundamental component is decreased as the projection width pitch is increased. This is because the amount of magnet is decreased as the projection width pitch is increased. On the other hand, the harmonic components vary dramatically depending on the projection width pitch. According to the permanent magnet rotary electric machine 10 of the first embodiment, the eleventh-order and thirteenth-order harmonic components are reduced in order to reduce the harmonic components while suppressing decrease in the fundamental component. As shown in FIG. 5, in order to reduce the eleventh-order and thirteenth-order harmonic components to approximately half or less of that in the case of no projection, it is necessary to design the projection width pitch to be in a range from 5% to 11%.

<Projection Width and Torque>

As described above, generally speaking, when the projections are provided, the fundamental component of the air-gap magnetic flux density is reduced, which then causes decrease in the torque. However, according to the permanent magnet rotary electric machine 10 of the first embodiment, the ferrite magnets 32 is designed to have a large thickness, thereby a reluctance torque is generated and the decrease in the torque is prevented. This feature will be described further below.

The torque T of the permanent magnet rotary electric machine 10, which is determined by a magnetic flux amount, an inductance, and a current, can be calculated by the following equation (3). In the equation (3), $T_m$ represents a magnet torque, $T_r$ represents a reluctance torque, and $P_n$ represents the number of pairs of poles (that is two when there are four poles). The magnet torque $T_m$ is expressed as a product of a magnetic flux amount $\phi_m$ of the ferrite magnets 32 and a q-axis current $i_q$. The reluctance torque $T_r$ is expressed as a product of a difference between a d-axis inductance $L_d$ and a q-axis inductance $L_q$, a d-axis current $i_d$, and the q-axis current $i_q$.

[Equation 3]

$$T = T_m + T_r = P_n\{\phi_m i_q + (L_d - L_q) i_d i_q\} \quad (3)$$

The magnetic flux amount $\phi_m$ can be calculated by the following equations (4) and (5) using the number of series conductors $N_{ph}$ in the permanent magnet rotary electric machine 10, the air-gap magnetic flux density $B_g$, a magnetic pole pitch $\tau_p$, a core width $L_c$, and a winding factor $k_w$ (determined by the number of poles, the number of slots, and the like of the permanent magnet rotary electric machine 10).

[Equation 4]

$$\phi_m = \sqrt{\frac{3}{2}} N_{ph} \frac{2}{\pi} B_g \tau_p L_c k_w \quad (4)$$

[Equation 5]

$$B_g = \frac{B_r}{1 + \frac{g_m}{L_m}\mu_r} \quad (5)$$

The q-axis inductance $L_q$ and d-axis inductance $L_d$ can be approximated by the following equations (6) and (7), respectively. In the equations (6) and (7), $N_s$ represents the number of slots, C represents the number of parallel circuits, n represents the number of windings of the winding wire, $S_t$ represents a circumferential width of the projections, $S_m$ represents a circumferential width of the permanent magnets ($S_t \ll S_m$), $g_m$ represents an air gap length at the circumferentially-middle of the permanent magnet, $g_t$ represents an air gap length at the projection, $L_m$ represents the radial thickness of the permanent magnet, and $\mu_0$ represents the permeability of vacuum.

[Equation 6]

$$L_q \approx \frac{N_s}{2C}\left\{n^2 \frac{S_t L_c}{g_t}\mu_0 + n^2 \frac{S_m L_c}{g_m + L_m}\mu_0\right\} \quad (6)$$

[Equation 7]

$$L_d \approx \frac{N_s}{2C}\left\{n^2 \frac{S_m L_c}{g_m + L_m}\mu_0\right\} \quad (7)$$

Accordingly, the torque T of the permanent magnet rotary electric machine 10 in the first embodiment is expressed by the following equation (8).

[Equation 8]

$$T = T_m + T_r = P_n\left\{\sqrt{\frac{3}{2}} N_{ph} \frac{2}{\pi} B_g \tau_p L_c k_w i_q - n^2 \frac{S_t L_c}{g_t}\mu_0 i_d i_q\right\} \quad (8)$$

Figure 6:
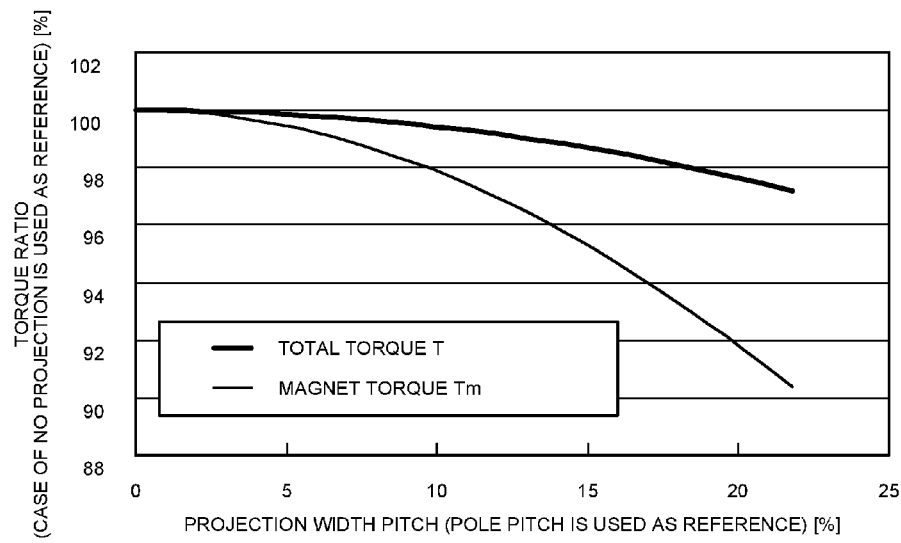
FIG. 6 is a diagram showing a relation between the projection width pitch and a torque in the permanent magnet rotary electric machine according to the first embodiment.

FIG. 6 is a diagram showing a relation between the projection width pitch and the torque in the permanent magnet rotary electric machine 10 according to the first embodiment. Specifically, FIG. 6 shows calculation results of the relation between the torque and the projection width pitch in the permanent magnet rotary electric machine 10 according to the first embodiment, which is obtained by using the equation (8). Referring to FIG. 6, since the permanent magnet rotary electric machine 10 in the first embodiment uses the ferrite magnet 32 having a low coercive force, the magnet thickness Lm is designed to be 10 or more times larger than the air gap length gm in order to improve the permeance coefficient Pc, and thereby the q-axis inductance $L_q$ becomes higher than the d-axis inductance $L_d$, which results in a structure having saliency. That is, the reluctance torque $T_r$ is generated, although the permanent magnet rotary electric machine 10 is a surface magnet rotary electric machine (an SPM rotary electric machine). As a result, as shown in FIG. 6, although the magnet torque $T_m$ is decreased due to increase in the projection width pitch, a decrease in the total torque T can be suppressed by the reluctance torque $T_r$.

Figure 7:
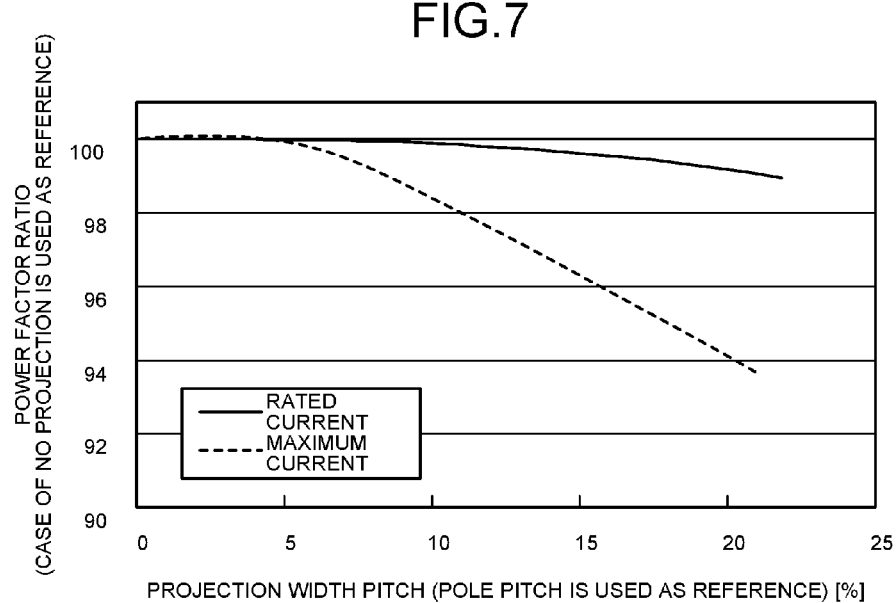
FIG. 7 is a diagram showing a relation between the projection width pitch and a power factor in the permanent magnet rotary electric machine according to the first embodiment.

FIG. 7 is a diagram showing a relation between the projection width pitch and a power factor in the permanent magnet rotary electric machine 10 according to the first embodiment. Specifically, FIG. 7 shows calculation results of the relation between the power factor and the projection width pitch in the permanent magnet rotary electric machine 10, which is obtained by using the equations (6) and (7). Note that in order to reduce a power-supply capacity as much as possible, it is preferable that the power factor is larger (closer to 1). As shown in FIG. 7, the power factor is decreased as the projection width pitch is increased, although it depends on the torque, namely, the magnitude of the supplied current. Therefore, in order to limit the decrease in the power factor to 3% or less, it is necessary to set the projection width pitch to be 13% or less.

<Magnet Thickness and Torque>

Figure 8:
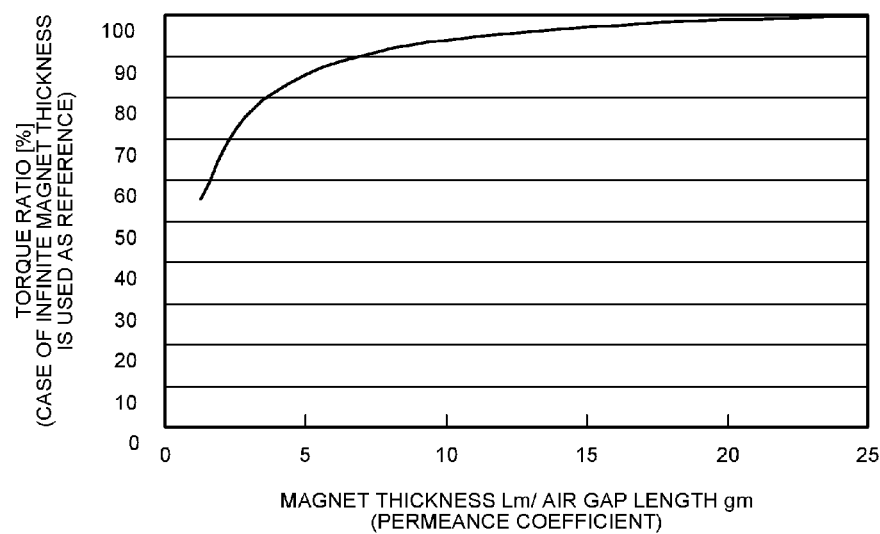
FIG. 8 is a diagram showing a relation between the permeance coefficient and the torque in the permanent magnet rotary electric machine according to the first embodiment.

Next, let us discuss relations between a projection height and the magnet thickness and the torque. FIG. 8 is a diagram showing a relation between the permeance coefficient and the torque in the permanent magnet rotary electric machine 10 according to the first embodiment. Specifically, FIG. 8 indicates a result of consideration of the relation between the magnet thickness and the torque, which is obtained by using the equation (8). As shown in FIG. 8, the torque T is increased as the magnet thickness Lm becomes larger, and the torque T converges to the maximum value around a point where the "magnet thickness Lm/air gap length gm" is close to 25. It should be noted that when the magnet thickness Lm becomes larger, the usage amount of the magnet is increased, which leads to an increase in costs of the magnet. In the permanent magnet rotary electric machine 10 according to the first embodiment, the "magnet thickness Lm/air gap length gm" is designed to be 10 or larger, in order to increase the torque T while minimizing the usage amount of the magnet and preventing demagnetization.

<Magnet Thickness and Saliency Ratio>

Figure 9:
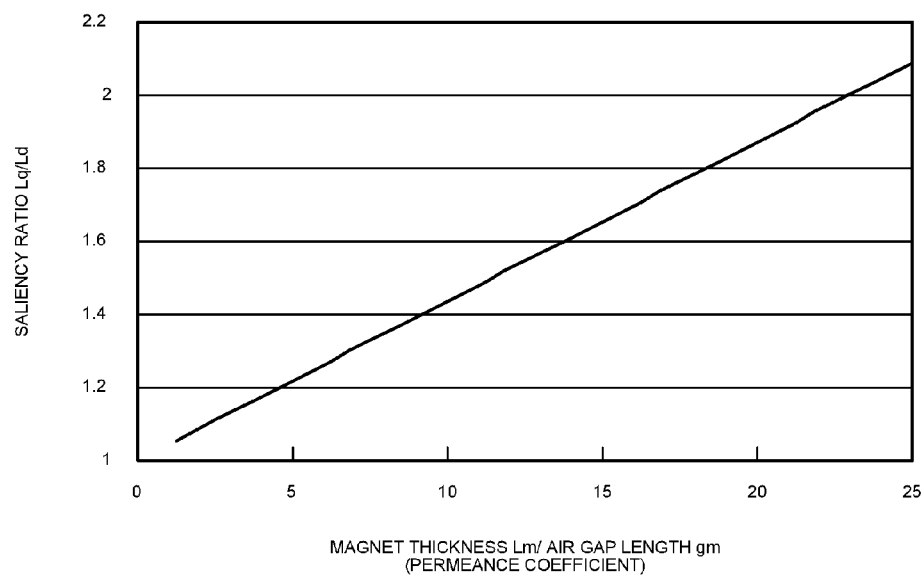
FIG. 9 is a diagram showing a relation between the permeance coefficient and a saliency ratio (Lq/Ld) in the permanent magnet rotary electric machine according to the first embodiment.

Next, the magnet thickness Lm and the saliency ratio ($L_q/L_d$) will be described with reference to FIG. 9. FIG. 9 is a diagram showing a relation between the permeance coefficient and the saliency ratio (Lq/Ld) in the permanent magnet rotary electric machine 10 according to the first embodiment. Specifically, FIG. 9 indicates a result of consideration of the relation between the magnet thickness Lm and the reluctance torque $T_r$, which is obtained by using the equations (6) and (7). As shown in FIG. 9, the saliency ratio ($L_q/L_d$) is increased as the magnet thickness Lm is increased. As has been shown in FIG. 6, when the projection width is increased, the magnet torque $T_m$ is decreased but the total torque T is not changed significantly. The reason is as follows: since the permeance coefficient Pc="magnet thickness Lm/air gap length gm" is set to be approximately 10 in the permanent magnet rotary electric machine 10 according to the first embodiment, the saliency ratio ($L_q/L_d$) is improved although it is a surface magnet rotary electric machine, and thus the reluctance torque $T_r$ is utilized effectively.

<Curvature Radius of Ferrite Magnet and Torque Pulsations>

Next, let us explain reduction in the torque pulsations due to change in the curvature radius $R_1$ of the outer periphery of the ferrite magnet 32. The equation (2) and FIG. 5 indicated the results in a case where the curvature radius $R_1$ of the outer periphery of the ferrite magnet 32 is assumed to be equal to the rotor radius $R_0$. In the permanent magnet rotary electric machine 10 according to the first embodiment, the curvature radius $R_1$ of the outer periphery of the ferrite magnet 32 is designed to be smaller than the rotor radius $R_0$ in order to achieve further reduction in the torque pulsations.

Figure 10:
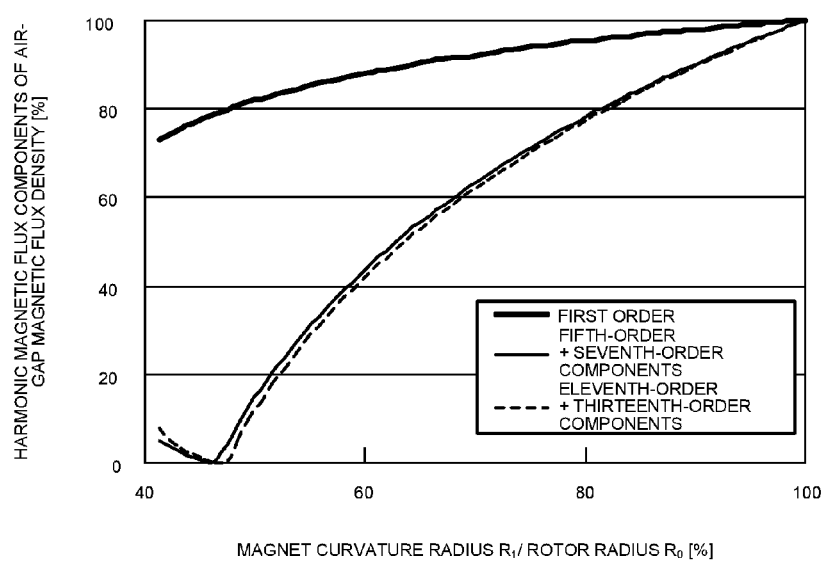
FIG. 10 is a diagram showing a relation between "a curvature radius of an outer periphery of magnet/a rotor radius" and harmonic components of the air-gap magnetic flux density in the permanent magnet rotary electric machine according to the first embodiment.

The air-gap magnetic flux density $B_g$ in the case where the curvature radius $R_1$ of the outer periphery of the ferrite magnet 32 is set smaller than the rotor radius $R_0$ is calculated by a numerical simulation in which the equation (1) is extended. FIG. 10 shows a relation between "curvature radius $R_1$ of outer periphery of ferrite magnet 32/rotor radius $R_0$" and the harmonic components of the air-gap magnetic flux density. In order to examine the average torque and the torque pulsations, we focus on the fundamental component (the first-order component), a sum of the fifth-order and seventh-order harmonic components, and a sum of the eleventh-order and thirteenth-order harmonic components of the air-gap magnetic flux density, as in the case of FIG. 5. Here, regarding the harmonic components of the air-gap magnetic flux density, a case where $R_1=R_0$ is used as a reference.

As shown in FIG. 10, both of the fundamental component and the harmonic components are decreased with decreasing $R_1$. Although it is preferable to reduce the harmonic components as much as possible, it is necessary to suppress decrease in the fundamental component as possible, because this decrease leads to increase in loss. Therefore, in the permanent magnet rotary electric machine 10 according to the first embodiment, the curvature radius $R_1$ of the outer periphery of the ferrite magnet 32 is designed to be equal to or larger than 60% of the rotor radius $R_0$ in order to achieve reduction in the torque pulsations while suppressing decrease in the fundamental component.

Second Embodiment

Change in Shape of Magnet Edge

Figure 11:
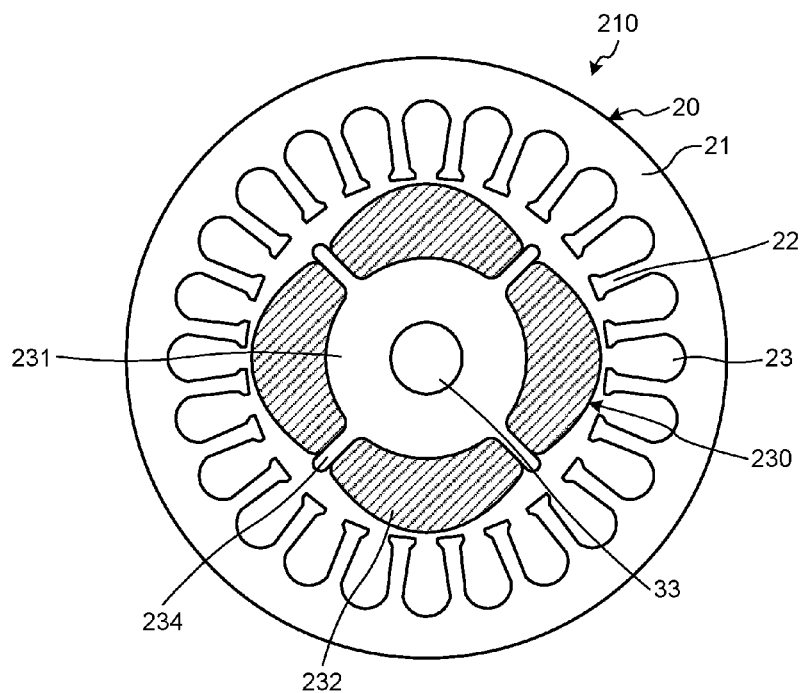
FIG. 11 is a cross-sectional view illustrating a permanent magnet rotary electric machine according to a second embodiment of the present invention.
Figure 12:
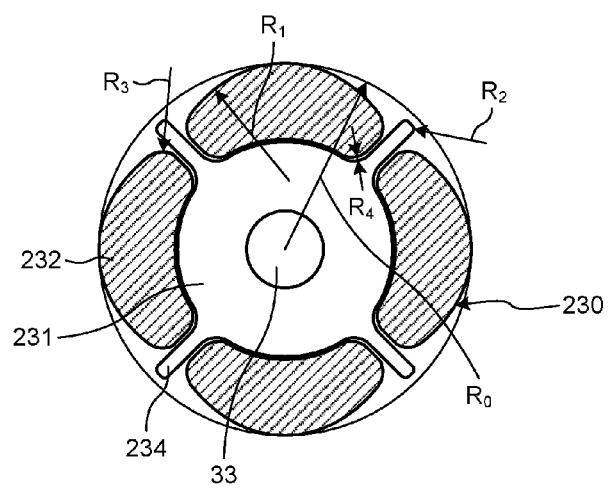
FIG. 12 is an enlarged cross-sectional view of a rotor of the permanent magnet rotary electric machine according to the second embodiment.

FIG. 11 is a cross-sectional view illustrating a permanent magnet rotary electric machine according to a second embodiment of the present invention. FIG. 12 is an enlarged cross-sectional view of a rotor of the permanent magnet rotary electric machine in the second embodiment. A permanent magnet rotary electric machine 210 according to the second embodiment is a rotary electric machine, where the number of poles is four, the number of slots is 24, the number of phases is three, and the number of slots per pole per phase is two.

In the permanent magnet rotary electric machine 210 according to the second embodiment, each of a corner of an edge of a ferrite magnet 232, and a corner of a tip and a base portion of a projection 234 is rounded to have a round shape (R-shape). A curvature radius of the R-shape of the corner of the ferrite magnet 232 on the side of the stator core 21 is represented as $R_3$. A curvature radius of the R-shape of the corner of the ferrite magnet 232 on the side of a rotor core 231, and a curvature radius of the R-shape of the base portion of the projection 234 are both represented as $R_4$. A curvature radius of the R-shape of the corner of the tip of the projection 234 is represented as $R_2$. In this case, the permanent magnet rotary electric machine 210 according to the second embodiment is configured such that a relation of $R_2<R_3<R_4$ is satisfied. Due to this configuration, it is possible to suppress a leakage flux at the edges of the ferrite magnets 232 while ensuring the strength of the projections 234 and the q-axis inductance $L_q$, which can achieve the high torque.

Third Embodiment

First Example of Projection

Figure 13:
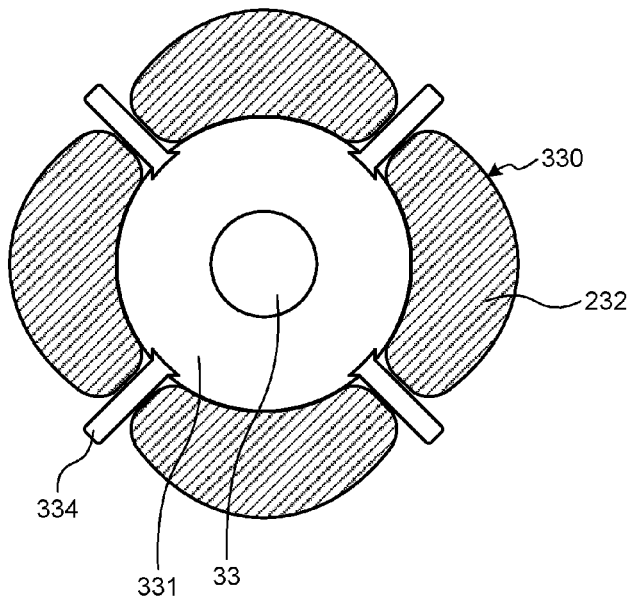
FIG. 13 is an enlarged cross-sectional view illustrating a rotor of a permanent magnet rotary electric machine according to a third embodiment of the present invention.

FIG. 13 is an enlarged cross-sectional view illustrating a rotor of a permanent magnet rotary electric machine according to a third embodiment of the present invention. In the permanent magnet rotary electric machine 10 in the first embodiment, the rotor core 31 that includes the projections 34 is formed by stacking a plurality of magnetic steel sheets. In a case of a rotor 330 in the third embodiment, a rotor core 331 and projections 334 are formed separately and then assembled. More specifically, the rotor core 331 is formed by stacking a plurality of magnetic steel sheets, and the projections 334 are formed from a block iron core. Due to the structure as descried above, the projections 334 can be formed even in a case of a small-sized rotary electric machine or the like, and in a case where the width of the projection 334 is so small that it is difficult to stamp the magnetic steel sheet or it is difficult to ensure the strength. Therefore, it is possible to achieve the high torque and the reduction in the torque pulsations, even in the case of a small-sized rotary electric machine or the like.

Fourth Embodiment

Second Example of Projection

Figure 14:
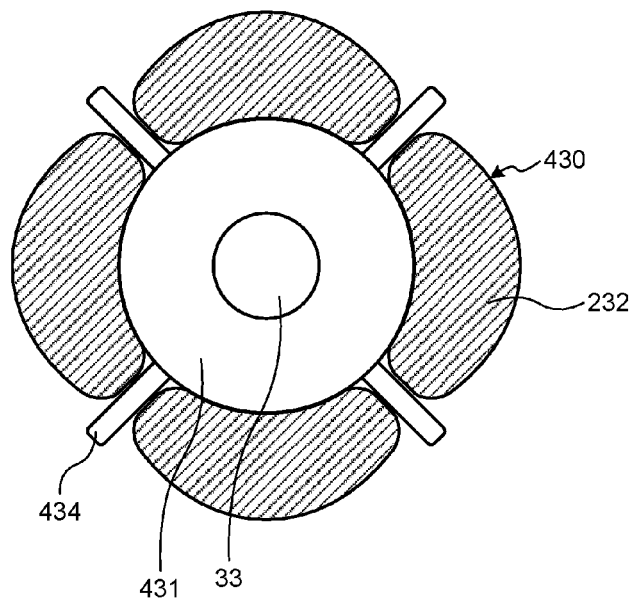
FIG. 14 is an enlarged cross-sectional view illustrating a rotor of a permanent magnet rotary electric machine according to a fourth embodiment of the present invention.

FIG. 14 is an enlarged cross-sectional view illustrating a rotor of a permanent magnet rotary electric machine according to a fourth embodiment of the present invention. In the case of the rotor 330 in the third embodiment, the rotor core 331 is formed by stacking the plurality of magnetic steel sheets, and the projections 334 are formed from the block iron core. In a case of a rotor 430 in the fourth embodiment, a rotor core 431 and projections 434 are formed from a block iron core, and then the rotor core 431 and the projections 434 are assembled by means of bolting or the like (not illustrated). Due to the structure as described above, the rotor 430 can be formed even in a case where it is difficult to stamp the magnetic steel sheets.

Fifth Embodiment

Shape of Permanent Magnet

Figure 15:
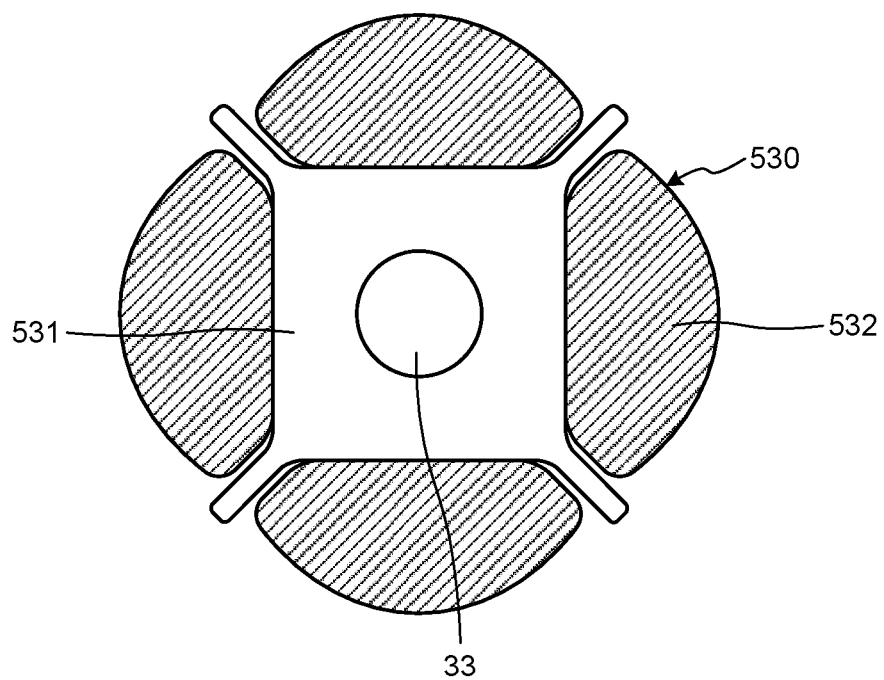
FIG. 15 is an enlarged cross-sectional view illustrating a rotor of a permanent magnet rotary electric machine according to a fifth embodiment of the present invention.

FIG. 15 is an enlarged cross-sectional view illustrating a rotor of a permanent magnet rotary electric machine according to a fifth embodiment of the present invention. In the cases of the rotors 30, 230, 330, and 430 in the first to fourth embodiments, the outer peripheries of the rotor cores 31, 231, 331, and 431 and the inner peripheries of the ferrite magnets 32, and 232 each has an arc shape. In a case of a rotor 530 in the fifth embodiment, an outer periphery of a rotor core 531 and an inner periphery of a ferrite magnet 532 each has a planar shape. This shape facilitates machining of the ferrite magnets 532, and therefore reduction in costs of the ferrite magnets 532 can be achieved.

Sixth Embodiment

Sensorless Drive

In a case of a typical permanent magnet rotary electric machine, it is necessary to supply a current to the winding wire of the stator based on a rotational position of the rotor, and thus a position sensor such as an optical encoder is required. However, the permanent magnet rotary electric machine of the present invention has the saliency, and it is thus possible to sense the rotational position of the rotor based on the saliency ratio of the rotary electric machine. Accordingly, in the sixth embodiment, the rotary electric machine is driven without using a position sensor. As a result, it is possible to reduce a size of the rotary electric machine and improve reliability (the number of parts which may malfunction can be reduced).

Moreover, the rotary electric machine according to the present invention uses the ferrite magnets 32, and 232 with a low coercive force, and thus has a lower magnetic flux density and is more resistant to magnetic saturation, as compared to a rotary electric machine using a neodymium magnet. Accordingly, a variation of the saliency ratio with respect to the current value and the position of the rotor 30, 230, 330, 430 or 530 is small, which enables a sensorless positioning operation. As a result, it is also possible to improve performance of a mechanical device provided with this rotary electric machine.

REFERENCE SIGNS LIST

10, 210 permanent magnet rotary electric machine, 20 stator, 21 stator core, 22 tooth, 23 slot, 30, 230, 330, 430, 530 rotor, 31, 231, 331, 431, 531 rotor core, 32, 232, 532 ferrite magnet, 33 shaft, 34, 234, 334, 434 projection.

The invention claimed is:

1. A permanent magnet rotary electric machine comprising:
    a stator in which a plurality of teeth and a plurality of slots are formed on an inner periphery of a cylindrical stator core, and a winding wire is wound around the teeth so as to be disposed in the slots; and
    a rotor disposed in a hollow portion of the stator with an air gap between the rotor and the stator,
    wherein in the rotor, a radial projection is provided on an outer periphery of a rotor core, a number of the projection is 2n or more (n is a natural number equal to or larger than 1), and a ferrite magnet is disposed between adjacent projections,
    wherein a lateral of the projection perpendicular to a projecting direction of the projection and an edge of the ferrite magnet have a shape along the projecting direction,
    wherein a radial height of the projection is less than a thickness of middle of the ferrite magnet and greater than a thickness of the edge of the ferrite magnet, and
    wherein when the thickness of the middle of the ferrite magnet is Lm, the radial height of the projection is Lt, and the thickness of the edge of the ferrite magnet is Lme, a relation of Lm>Lt>Lme is satisfied.

2. The permanent magnet rotary electric machine according to claim 1,
    wherein a projection width of the projection in a circumferential direction is in a range from 5% to 11% of a magnetic pole pitch (=π×rotor outer diameter/number or poles).

3. The permanent magnet rotary electric machine according to claim 1,
    wherein the thickness of the middle of the ferrite magnet is 10 or more times larger than a length of the air gap between the stator and the rotor.

4. The permanent magnet rotary electric machine according to claim 1,
    wherein a curvature radius of an outer periphery of the ferrite magnet is in a range from 60% to 100% of a radius of the rotor.

5. The permanent magnet rotary electric machine according to claim 1,
    wherein when a curvature radius of an R-shape of a corner of a tip of the projection is $R_2$, a curvature radius of an R-shape of a stator-core-side corner of the ferrite magnet is $R_3$, and a curvature radius of an R-shape of a rotor-core-side corner of the ferrite magnet is $R_4$, a relation of $R_2<R_3<R_4$ is satisfied.

6. The permanent magnet rotary electric machine according to claim 1,
    wherein the rotor core is formed by stacking a plurality of magnetic steel sheets, the projection is formed from a block iron core, and then the rotor core and the projection are assembled,
    or the rotor core and the projection are formed from a block iron core, and then assembled by means of bolting.

7. The permanent magnet rotary electric machine according to claim 1,
    wherein an outer periphery of the rotor core and an inner periphery of the ferrite magnet have a planar shape.

8. The permanent magnet rotary electric machine according to claim 1,
    wherein the permanent magnet rotary electric machine is driven without using a position sensor that detects a rotational position of the rotor.

* * * * *